United States Patent
Koh

(10) Patent No.: US 9,936,754 B2
(45) Date of Patent: Apr. 10, 2018

(54) METHODS OF DETERMINING MEASUREMENTS FOR CUSTOM CLOTHING MANUFACTURE

(71) Applicant: Original Inc., San Francisco, CA (US)

(72) Inventor: Chong-Jin Koh, San Francisco, CA (US)

(73) Assignee: Original Inc., San Francisco, CA (US)

( * ) Notice: Subject to any disclaimer, the term of this patent is extended or adjusted under 35 U.S.C. 154(b) by 176 days.

(21) Appl. No.: 15/138,103

(22) Filed: Apr. 25, 2016

(65) Prior Publication Data
US 2017/0303616 A1 Oct. 26, 2017

(51) Int. Cl.
*A41H 1/00* (2006.01)
*G01B 11/25* (2006.01)
*G06T 17/00* (2006.01)

(52) U.S. Cl.
CPC ............ *A41H 1/00* (2013.01); *G01B 11/2513* (2013.01); *G06T 17/00* (2013.01)

(58) Field of Classification Search
CPC ........................................................ A41H 1/00
USPC ........................................ 33/11, 17 A, 17 R
See application file for complete search history.

(56) References Cited

U.S. PATENT DOCUMENTS

| | | | |
|---|---|---|---|
| 5,031,326 A * | 7/1991 | Huang | A41H 3/00 33/12 |
| 5,956,525 A | 9/1999 | Minsky | |
| 6,166,830 A * | 12/2000 | Koh | H04N 1/2104 358/473 |
| 6,415,199 B1 * | 7/2002 | Liebermann | A41H 1/02 33/512 |
| 6,490,534 B1 | 12/2002 | Pfister | |
| D792,429 S * | 7/2017 | Koh | A41H 1/00 D14/485 |

(Continued)

FOREIGN PATENT DOCUMENTS

WO WO2011142655 A2 11/2011
WO WO2014076633 A1 5/2014

OTHER PUBLICATIONS

Proper Cloth LLC, "Proper Cloth, Design the perfect shirt" webpage, Available at: https://propercloth.com/design-a-shirt/, last accessed on Apr. 10, 2017.

(Continued)

*Primary Examiner* — G. Bradley Bennett
(74) *Attorney, Agent, or Firm* — American Patent Agency PC; Daniar Hussain; Xiaomeng Shi

(57) ABSTRACT

The technology disclosed relates to methods usable for determining measurements for custom clothing manufacture, including receiving a raw image of a clothing article and a scale reference, and applying perspective correction to adjust the raw image to produce an adjusted image. The method also includes determining a scale reference from the adjusted image, for use with a line measurement tool; and receiving user inputs that positions ends of the line measurement tool on measurement reference positions on the adjusted image of the clothing article. The method further includes generating multiple clothing article distances between the measurement reference positions on the adjusted image of the clothing article using the line measurement tool; and storing at least three clothing article distances for use in producing a custom clothing article with a fit based on the favorite clothing article in the raw image.

20 Claims, 8 Drawing Sheets

(56) References Cited

U.S. PATENT DOCUMENTS

| | | | | |
|---|---|---|---|---|
| D795,275 S | * | 8/2017 | Koh | A41H 1/00 |
| | | | | D14/485 |
| D806,095 S | * | 12/2017 | Koh | A41H 1/00 |
| | | | | D14/485 |
| 2005/0154487 A1 | * | 7/2005 | Wang | A41H 1/00 |
| | | | | 700/132 |
| 2014/0270540 A1 | | 9/2014 | Spector et al. | |
| 2014/0277663 A1 | | 9/2014 | Gupta et al. | |
| 2014/0360030 A1 | * | 12/2014 | Grove | A41H 3/007 |
| | | | | 33/17 R |
| 2015/0026990 A1 | * | 1/2015 | Ellis | A41H 1/00 |
| | | | | 33/15 |
| 2015/0130795 A1 | * | 5/2015 | Chhugani | G06T 19/20 |
| | | | | 345/419 |
| 2015/0342266 A1 | * | 12/2015 | Cooper | A41B 11/00 |
| | | | | 705/26.7 |

OTHER PUBLICATIONS

Bit Body, Inc., MTailor webpage and mobile application, Available at https://www.mtailor.com/, last accessed on Apr. 10, 2017.
AFT GMBH, "Tailor4less" webpage, Available at: https://www.tailor4less.com/en/men/custom-dress-shirts/, last accessed on Apr. 10, 2017.
Flex Japan Corporation, "Karuizawa shirt" webpage, Available at: http://karuizawa-shirt.jp/builder, last accessed on Apr. 10, 2017 with Google Translate.
Li, Larry, "Time-of-Flight Camera—An Introduction," Texas Instruments, Technical White Paper, SLOA190B, Jan. 2014, Revised May 2014, 10 pages.

* cited by examiner

METHODS OF DETERMINING MEASUREMENTS FOR CUSTOM CLOTHING MANUFACTURE

BACKGROUND OF THE INVENTION

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

There are number of different ways individuals can obtain custom-manufactured clothing. One is to work with a tailor. Visiting the tailor in person allows that professional to take the necessary measurements and ask the appropriate questions in an attempt to create a garment which will please the customer insofar as fit, fabric, color, structural features such as the type and size of buttons, plackets, and pockets, and ornamentation such as beads, sequins and piping.

Instead of visiting a tailor in person, custom-manufactured clothing can be ordered from a custom clothing manufacturer. This can be done by answering various questions and providing necessary information and mailing the information to the custom clothing manufacture. Alternatively, the information can be provided orally by telephone or provided through a computer connection. In some cases the information can be provided to the custom clothing manufacturer through a personal visit. A combination of methods can also be used. However, in any event the customer must take all the required measurements and provide the custom clothing manufacturer with the appropriate measurements for the article of clothing being created.

Therefore, an opportunity arises to provide methods for determining measurements for custom clothing manufacture. Efficient determination of measurements for use in producing a custom clothing article with a fit based on a user-provided image of a favorite clothing article may improve the user experience.

The disclosed technology relates to providing methods for determining measurements for custom clothing manufacture.

BRIEF SUMMARY OF THE INVENTION

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

One aspect of the present technology is the recognition that requiring an individual to provide their own body measurements necessary to create a properly fitting article of clothing is a significant impediment to ordering custom-manufactured clothing from a custom clothing manufacturer. Many people do not want to bother with or take the time to take the necessary measurements. Some people cannot physically take all the necessary measurements required for the clothing article. In addition, the measurements provided by the individual may not be accurate for a number of reasons, including improper placement of the measuring tape and improper tension on the measuring tape. One person's hip measurement may not be another person's hip measurement.

The present technology eliminates these problems through the recognition that most, if not all, people have an article of clothing, for example a shirt, which they find fits them extremely well. This application will sometimes refer to this as a favorite clothing article or favorite shirt. The following discussion will be primarily directed to a favorite shirt; it is to be understood that the technology can be applicable to a wide variety of clothing articles, including for example pants, shirts, blazes, jackets, sweaters, T-shirts, polo shirts and dresses.

A further aspect of the present technology relates to the recognition that all the information a custom clothing manufacturer would need to create an article of clothing with a fit based upon the favorite article clothing can be provided by (1) an image of the article clothing, and (2) a scale reference. The scale reference not only provides dimensional information, it also permits perspective correction to be applied to the user-generated image.

Implementation of a first example of a method for determining measurements for custom clothing manufacture is carried out as follows. The method includes receiving a raw image of a clothing article and a scale reference; recognizing the scale reference; and using the scale reference and a hardware processor, applying perspective correction to adjust the raw image and produce an adjusted image. The method also includes determining a scale of the adjusted image from the scale reference for use with a line measurement tool; causing display of the adjusted image and the line measurement tool on a user display; and receiving user input that positions ends of the line measurement tool on measurement reference positions on the adjusted image of the clothing article. The method further includes generating a clothing article distance between the measurement reference positions on the adjusted image of the clothing article using the line measurement tool; repeating the receiving user input and the clothing article distance generating steps n times to generate at least n+1 clothing article distances, n being an integer equal to at least 3; and storing the at least n+1 clothing article distances for use in producing a custom clothing article with a fit based on the clothing article in the raw image.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3 also shows measurement lines terminating at measurement reference positions on the adjusted image.

DETAILED DESCRIPTION

Figure 1:
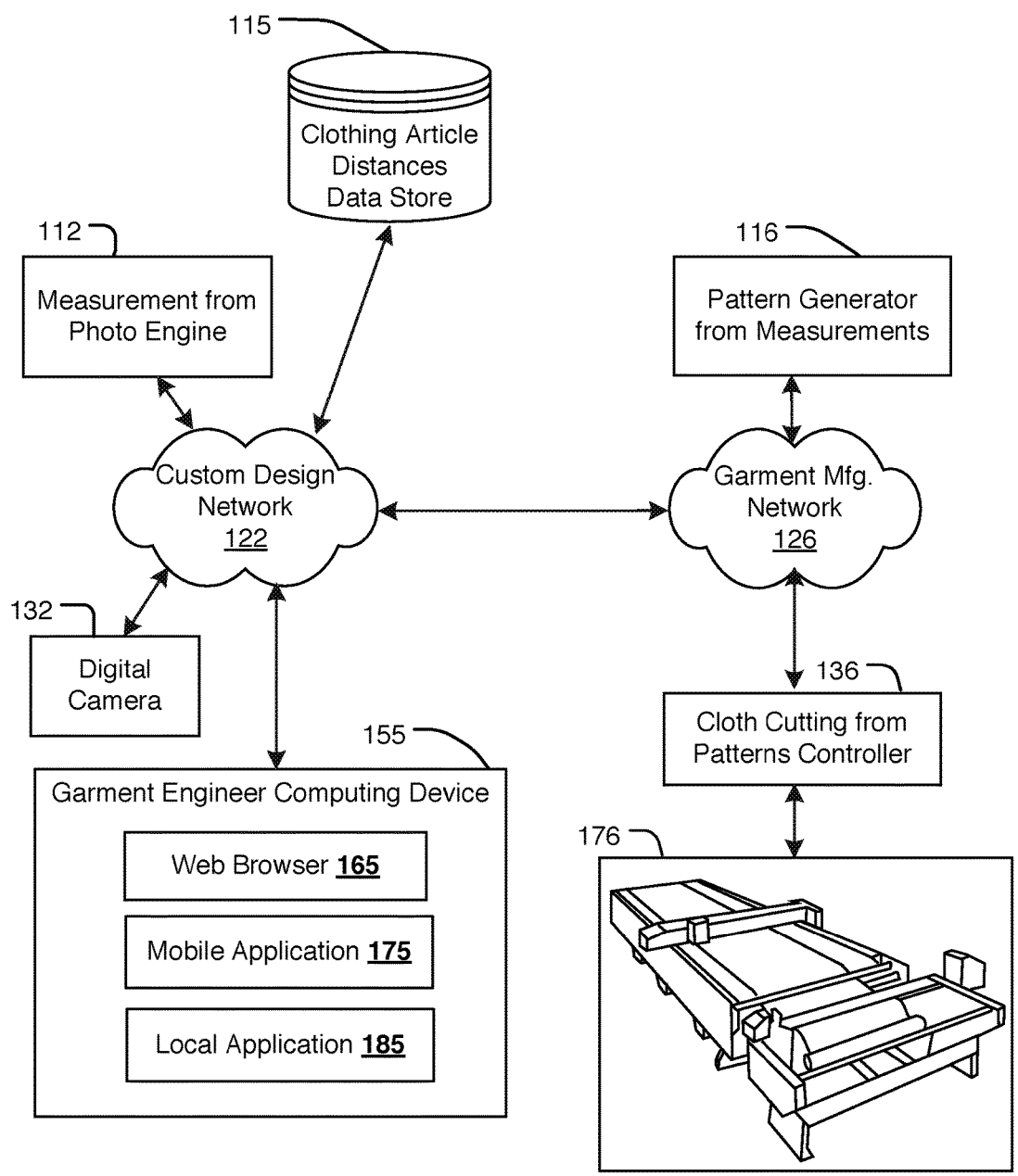
FIG. 1 illustrates one implementation of an environment for determining measurements for custom clothing manufacture.

The following description will typically be with reference to specific structural embodiments and methods. It is to be understood that there is no intention to-be limited to the specifically disclosed embodiments and methods but that other features, elements, methods and embodiments may be used for implementations of this disclosure. Preferred embodiments are described to illustrate the technology disclosed, not to limit its scope, which is defined by the claims. Those of ordinary skill in the art will recognize a variety of equivalent variations on the description that follows. Unless otherwise stated, in this application specified relationships, such as parallel to, aligned with, or in the same plane as, mean that the specified relationships are within limitations of manufacturing processes and within manufacturing variations. When components are described as being coupled, connected, being in contact or contacting one another, they need not be physically directly touching one another unless specifically described as such. Like elements in various embodiments are commonly referred to with like reference numerals.

FIG. 1 illustrates one implementation of an environment 100 for determining measurements for custom clothing manufacture. Environment 100 includes clothing article distances data store 115, measurement-from-photo engine 112, custom design network 122, digital camera 132 and garment engineer computing device 155 which can include web browser 165, mobile application 175 and local application 185. Environment 100 can also include pattern generator from measurements 116, garment manufacturing network 126, cloth cutting from patterns controller 136 and cloth cutting machine 176. In one example, the cloth cutting machines can include multi-ply conveyorized cutting, single-ply conveyorized cutting and single-ply static cutting machines by Gerber Technology. In another example, the cloth cutting machines can be Shima Seiki multi-ply cutting machines, or another cutting machine.

Digital camera 132 is usable to capture images of clothing articles, and can be a stand-alone camera or part of another device, such as an Internet-connected computing device with a camera, such as what is commonly presently referred to as a smart phone, including, for example, an iPhone® from Apple Computer and Android-based phones from Samsung and LG. Other devices such as tablets are also usable to capture and transfer an image of a favorite clothing article. The image can be delivered on paper and re-digitized or delivered electronically.

Measurement-from-photo engine 112 generates measurements based on images of clothing articles received from digital camera 132 as described later. The measurements can be stored in clothing article distances data store 115, and can be transferred from measurement-from-photo engine 112. In some implementations, measurement-from-photo engine 112 is a local application 185 on a garment engineer computing device 155, which includes a garment engineer UI on web browser 165 or mobile application 175

Clothing article distances data store 115 can include measurements for an assortment of clothing articles such as pants, shirts, blazes, jackets, sweaters, T-shirts, polo shirts, dresses, shoes and boots, as described later. Clothing article distances data store 115 can be implemented using a general-purpose distributed memory caching system. In some implementations, data structures can store information from one or more garment engineers into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

In one implementation, a pattern generator from measurements 116 can accept clothing article distance measurements via garment manufacturing network 126, for generating patterns for making the favorite clothing article. In another implementation, custom cloth cutting from patterns controller 136 can control cloth cutting machine 176 to cut cloth using clothing article distance measurements received for the favorite clothing article.

The raw image of the clothing article from digital camera 132 can be imported or uploaded to a computer-based system using one of multiple transfer technologies including but not limited to direct image upload, text message, email or social media message: via a WiFi hotspot or a network. The raw image could be captured from a clothing article or from a printed picture of a clothing article, with the raw image including the clothing article and a scale reference, such as an A4 sheet of paper.

Custom design network 122 and garment manufacturing network 126 can each be any network or combination of networks of devices that communicate with one another. For example, custom design network 122 and garment manufacturing network 126 can be implemented using one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, Wi-Fi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

Figure 2:
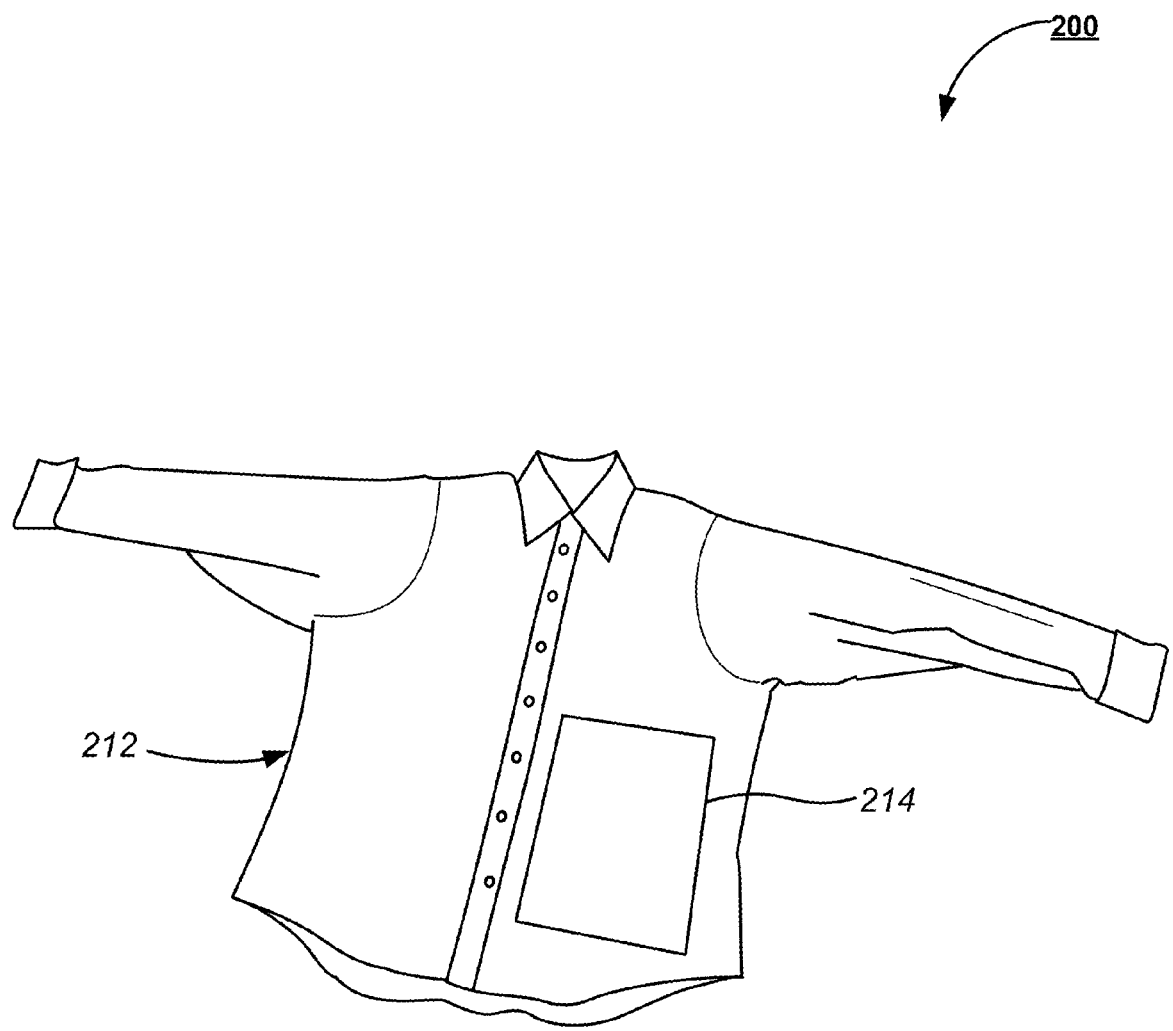
FIG. 2 is a raw image of a favorite clothing article with a scale reference being provided by a reference rectangle in the raw image, the reference rectangle is shown as a non-rectangular quadrilateral due to the orientation at which the image was captured.

FIG. 2 illustrates a raw image 200 of a favorite clothing article 212 which, in this example, was captured by the owner of the clothing article. The owner considers it a favorite clothing article, as that term is used in this application, because the owner likes the way it looks and feels. The owner would like another clothing article made which provides the same fit as the favorite clothing article. In this example, raw image 200 was captured using a camera, capable of being connected to the Internet for transfer of images, to facilitate transfer of measurements of the favorite clothing article to a custom clothing manufacturer.

In preparation for capturing an image of the favorite clothing article, a rectangular reference object—for example an 8.5×11 sheet of paper or a credit card, is placed on or in near proximity to the clothing article. Raw image 200 in FIG. 2 includes the image of reference rectangle 214. The reference rectangle in the raw image is shown as a non-rectangular quadrilateral due to the orientation at which the image was captured. In this example, reference rectangle 214 is placed on clothing article 212; it could also be only partially on clothing article 212 or it could be positioned separate from, but near, clothing article 212 so that it remains within raw image 200. As is evident in FIG. 2, the shape of reference rectangle 214 in FIG. 2 is a non-rectangular quadrilateral because of the non-perfect, skewed orientation at which the image of clothing article 212 was captured. In this example, reference rectangle 214 acts as a scale reference.

Figure 3:
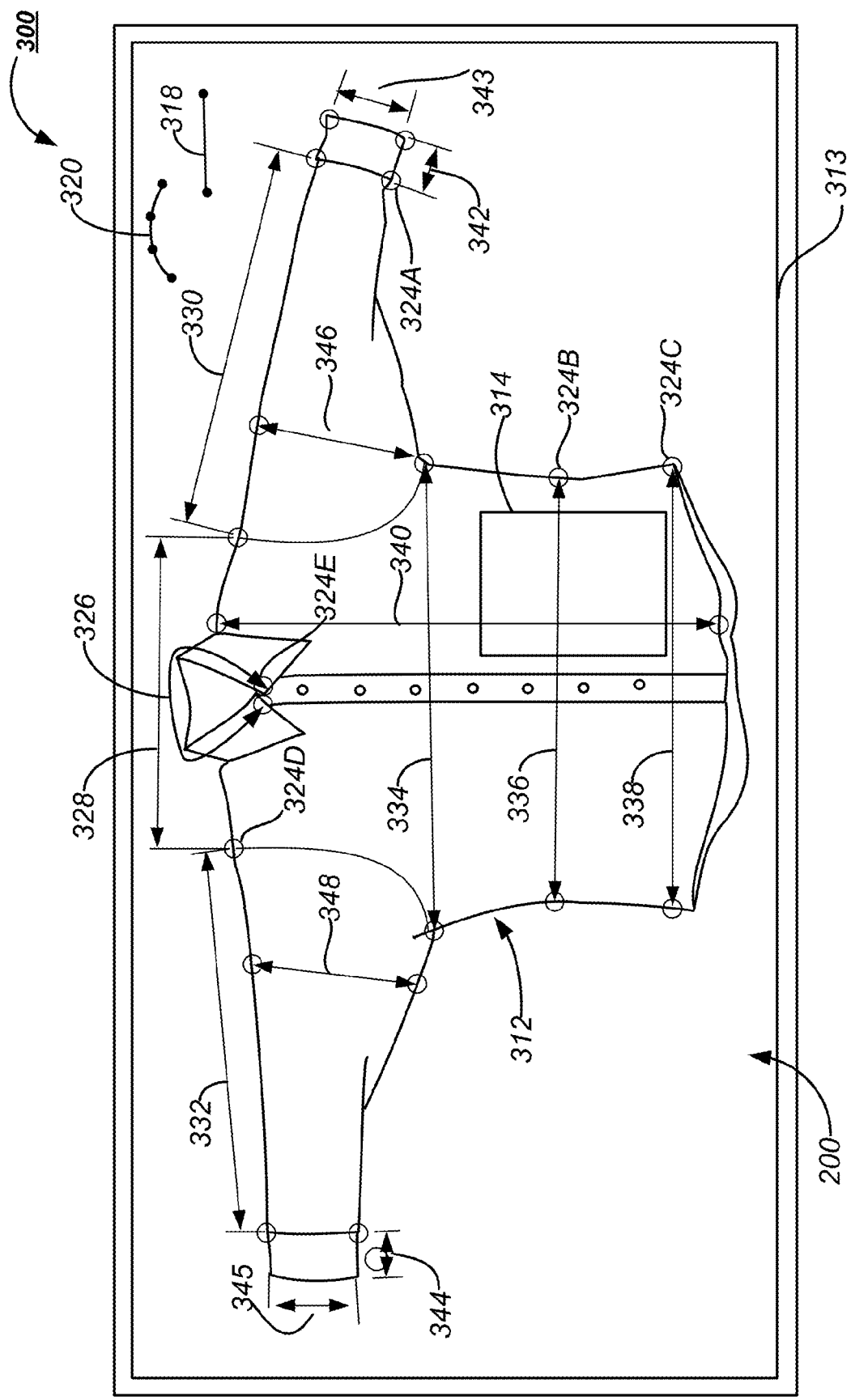
FIG. 3 is an adjusted image of the clothing article of FIG. 1, together with exemplary line measurement tools, created by using the scale reference and a hardware processor and applying perspective correction, the reference rectangle being shown as a true rectangle through the application of perspective correction.

Perspective correction of the raw image results in an adjusted image that includes the scale reference viewable as a true rectangle—a quadrilateral with four right angles, and is rotated relative to the raw image. FIG. 3 illustrates adjusted image 300 of clothing article 212 of FIG. 2. Reference rectangle 314 in FIG. 3 is shown as a true rectangle with opposite sides being the same length and with 90° angles at its corners—the scale reference.

In one example, to reproduce a favorite shirt, up to twelve different measurements need to be available. These measurements can include, but are not limited to collar, shoulder, left sleeve, right sleeve, chest, waist, hip, length, left cuff, right cuff, left bicep, and right bicep.

FIG. 3 shows an adjusted image of the favorite shirt with measurements 300 as it would be displayed on a screen 313 of a user display. FIG. 3 also includes two examples of line measurement tools: a straight-line measurement tool 318 and a curved-line measurement tool 320. Line measurement tools 318, 320 are used to connect pairs of measurement reference positions 324A, 324B, 324C, 324D, 324E (denoted by open circles) with measurement lines. In this example, twelve different measurement lines are created. Curved line measurement tool 320 is used to create collar measurement line 326. Straight line measurement tool 318 is used to create each of the following measurement lines: shoulder measurement line 328, left sleeve measurement line 330, right sleeve measurement line 332, chest measurement line 334, waist measurement line 336, hip measurement line 338, length measurement line 340, left cuff measurement line 342, left cuff diameter 343, right cuff measurement line 344, left cuff diameter 345, left bicep measurement line 346, and right bicep measurement line 348. A greater or lesser number of measurement lines and different measurement lines can be used according to the particular type or style of the clothing article. The selection of the measurement reference positions 324A, 324B, 324C, 324D, 324E (denoted by open circles) for the measurement lines will depend in large part on the patternmaking software used with the equipment, typically a fabric cutting machine, used in creating the clothing article.

The size and aspect ratio of the reference rectangle can be determined via different approaches, explicit or automatically determined. A user can identify the reference rectangle used, such as an A4 or 8.5×11 paper or other object, a 3×5 notecard, or a ISO/IEC standard dimension credit card. A rectangle scoring algorithm, further described later, can find the explicitly identified rectangle. That is, the measurement-from-photo engine 112 can receive dimensions of the reference rectangle. Another option would be to allow the software to guess/determine the size of the reference rectangle based upon characteristics of the captured image when compared to a data store of common document sizes. Multiple rectangles in a picture can be found, one selected and its dimensions deduced from a list of allowed dimensions and aspect ratios. Or, the size and rounded corners as well as any text or logo on the reference rectangle could indicate that it is a credit card. In one use case, the customer could select from a supplied list of common items which could be used as a reference rectangle, such as a credit card, a dollar bill, or a sheet of standard sized paper.

In one implementation, the transformation from the raw image shown in FIG. 2 to the adjusted image of FIG. 3, which shows perspective correction, includes receiving the raw image of a clothing article and a scale reference; and recognizing the scale reference.

Using the scale reference and a hardware processor, perspective correction gets applied to adjust the raw image and produce an adjusted image. In one implementation, an open source library of programming functions and methods, such as CV2 provided by OpenCV (http://opencv.org/), can be used to implement the steps in the process, which includes locating perspectives of rectangles in the raw image, scoring the figures located to identify a quadrilateral that corresponds to the reference rectangle, and completing a four point transform of points in the located quadrilateral to form a rectangle with right angles at the corners. A Gaussian blur algorithm can be used to reduce image noise.

Using the dimensions of the adjusted image the set of destination points can be constructed to obtain a bird's eye view—a top-down view—of the image, after finding squares in the image by searching for four-sided contours, and then scoring and sorting the contours relative to a variety of factors including aspect ratio with respect to the overall image. In some cases, the search for squares can be challenging due to the existence of checkerboard patterns in the surface on which the favorite clothing article rested when the image was captured, or if the favorite clothing article includes a plaid pattern in the fabric. Continuing with the perspective correction process, after finding, scoring and sorting the contours, the resulting aspect ratio constraint is usable to produce an adjusted image.

The width of adjusted image 300 is computed as the maximum distance between the bottom-right and bottom-left x-coordinates and the top-right and top-left x-coordinates. The height of the adjusted image is computed as the maximum distance between the top-right and bottom-right coordinates y-coordinates and the top-left and bottom-left y-coordinates.

Using the adjusted image in conjunction with a straight-line measurement tool and a curved-line measurement tool such as those shown in FIG. 3, the scale of the scale reference can be determined and is usable with a line measurement tool.

The adjusted image and the line measurement tool can be displayed on a user display. The garment engineer or other user positions the ends of the line measurement tool on measurement reference positions on the adjusted image of the clothing article; and the clothing article distance between the measurement reference positions on the adjusted image of the clothing article can be generated using the line measurement tool. After repeating the process of receiving n positions for the ends of the line measurement tool, and generating the n+1 clothing article distances, the resulting measurements are stored in clothing article distances data store 115. The generated clothing article distance measurements can also be provided to garment manufacturing network 126, for generating patterns for making the favorite clothing article, or to custom cloth cutting from patterns controller 136 for cutting cloth for the favorite shirt.

In another implementation for determining measurements for custom clothing manufacture, the measurement-from-photo engine 112 can measure a favorite clothing article first, and then adjust the perspective and transform the clothing article distance parameters, as described next.

Figure 4:
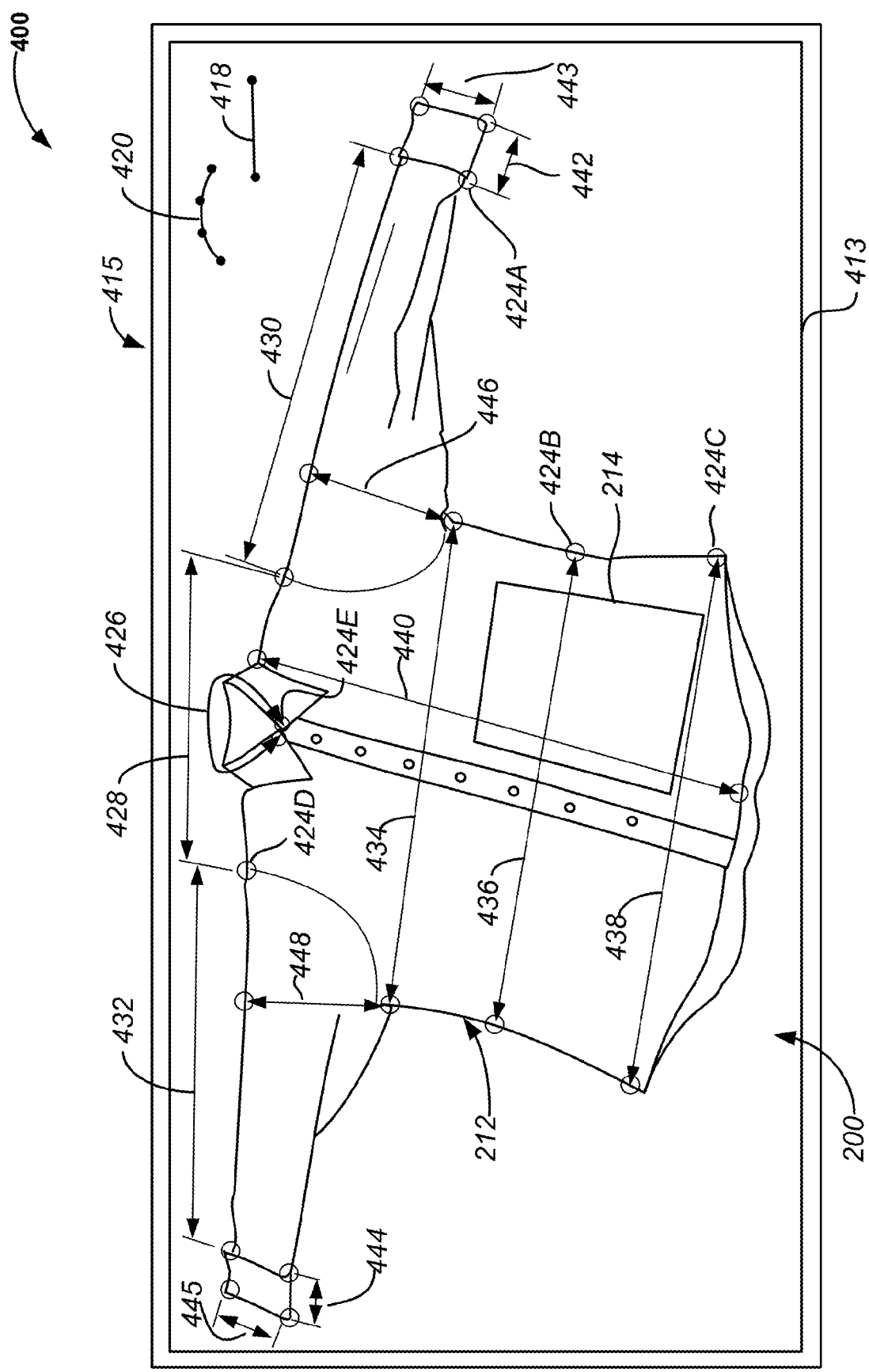
FIG. 4 shows measurement tools and measurement reference positions for an unadjusted drawing from an image of a favorite clothing article.

FIG. 4 shows a raw image of the favorite shirt with measurements 400 as it would be displayed on a screen 413 of a user display 415. FIG. 4 also includes two examples of line measurement tools: a straight-line measurement tool 418 and a curved-line measurement tool 420. Line measurement tools 418, 420 are used to connect pairs of measurement reference positions 424A, 424B, 424C, 424D, 424E (denoted by open circles) with measurement lines. In this example, twelve different measurement lines are created. Curved line measurement tool 420 is used to create collar measurement line 426. Straight line measurement tool 418 is used to create each of the following measurement lines: shoulder measurement line 428, left sleeve measurement line 430, right sleeve measurement line 432, chest measurement line 434, waist measurement line 436, hip measurement line 438, length measurement line 440, left cuff measurement line 442, left cuff diameter 443, right cuff measurement line 444, left cuff diameter 445, left bicep measurement line 446, and right bicep measurement line 448. A greater or lesser number of measurement lines and different measurement lines can be used according to the particular type or style of the clothing article. The selection of the measurement reference positions 424A, 424B, 424C, 424D, 424E (denoted by open circles) for the measurement lines will depend in large part on the patternmaking software used with the equipment, typically a fabric cutting machine, used in creating the clothing article.

The measurement-from-photo engine 112 receives a raw image of a clothing article 212 and a scale reference 214; causes display of the raw image and a line measurement tool on a user display 415; receives user input comprising first and second points, that position ends of the line measurement tool on measurement reference positions on the raw image of the clothing article; and generates a pair of clothing article distance parameters based on the measurement reference positions on the raw image of the clothing article. This method includes repeating the receiving user input and the generating clothing article distance parameters steps n times to generate at least n+1 clothing article distances, with n being an integer equal to at least three. The measurement-from-photo engine 112 recognizes the scale reference 214 and, using the scale reference 214, applies perspective correction to adjust the raw image and produce an adjusted image; and determines a perspective corrected scale of the adjusted image from the scale reference for use producing clothing article distances. Then the clothing article distance parameters are transformed using the processor and the perspective corrected scale to produce clothing article distances; and the clothing article distances are stored for use in producing a custom clothing article with a fit based on the clothing article in the raw image. In some use cases, generating a pair of clothing article distance parameters comprises generating a distance and an angle orientation of a segment between the ends of the line measurement tool.

Figure 5:
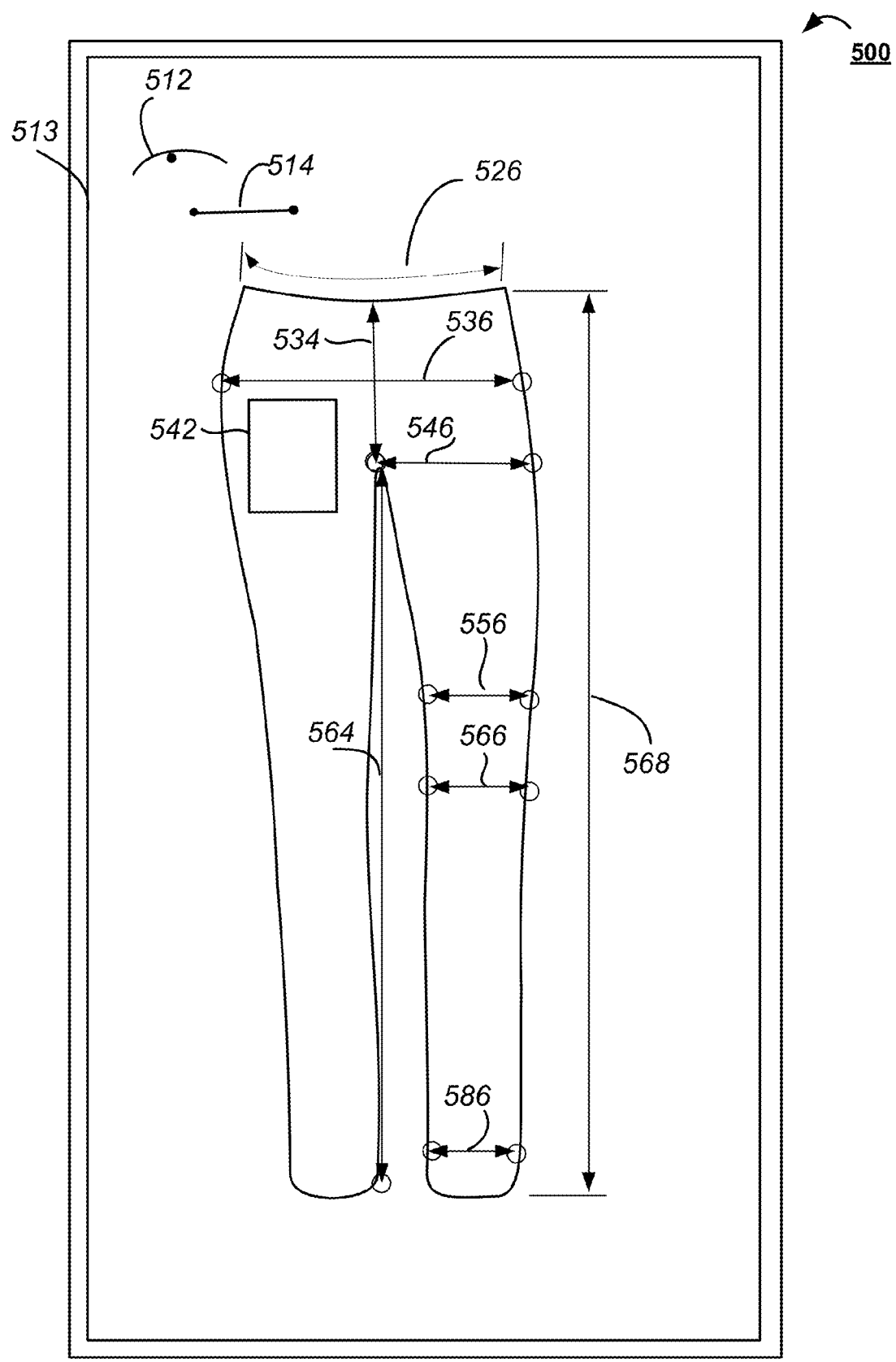
FIG. 5 is an adjusted image of a pair of favorite pants, together with exemplary line measurement tools, created by using the scale reference and a hardware processor and applying perspective correction, the reference rectangle being shown as a true rectangle through the application of perspective correction.

FIG. 5 shows an adjusted image of a favorite pair of pants with measurements 500 as it would be displayed on a screen 513 of a user display, with dimensions useful for requesting a favorite pair of pants. Reference rectangle 542 in FIG. 5 is shown as a true rectangle with opposite sides being the same length and with 90° angles at its corners—the scale reference. Adjusted image FIG. 5 also includes two examples of line measurement tools: a straight-line measurement tool 514 and a curved-line measurement tool 512. As described for the earlier example clothing article images, line measurement tools 512, 514 are used to connect pairs of measurement reference positions. In this example, nine different measurement lines are created. Curved line measurement tool 512 is used to create waist measurement line 526. Straight line measurement tool 514 is used to create each of the following measurement lines: waist to crotch 534, width at hips 536, pant leg width at crotch 546, pant leg width at thigh 556, pant leg width at knee 566, pant leg width at bottom seam 586, pant total length 568, and inseam length 564. A greater or lesser number of measurement lines and different measurement lines can be used according to the particular type or style of the clothing article.

Figure 6:
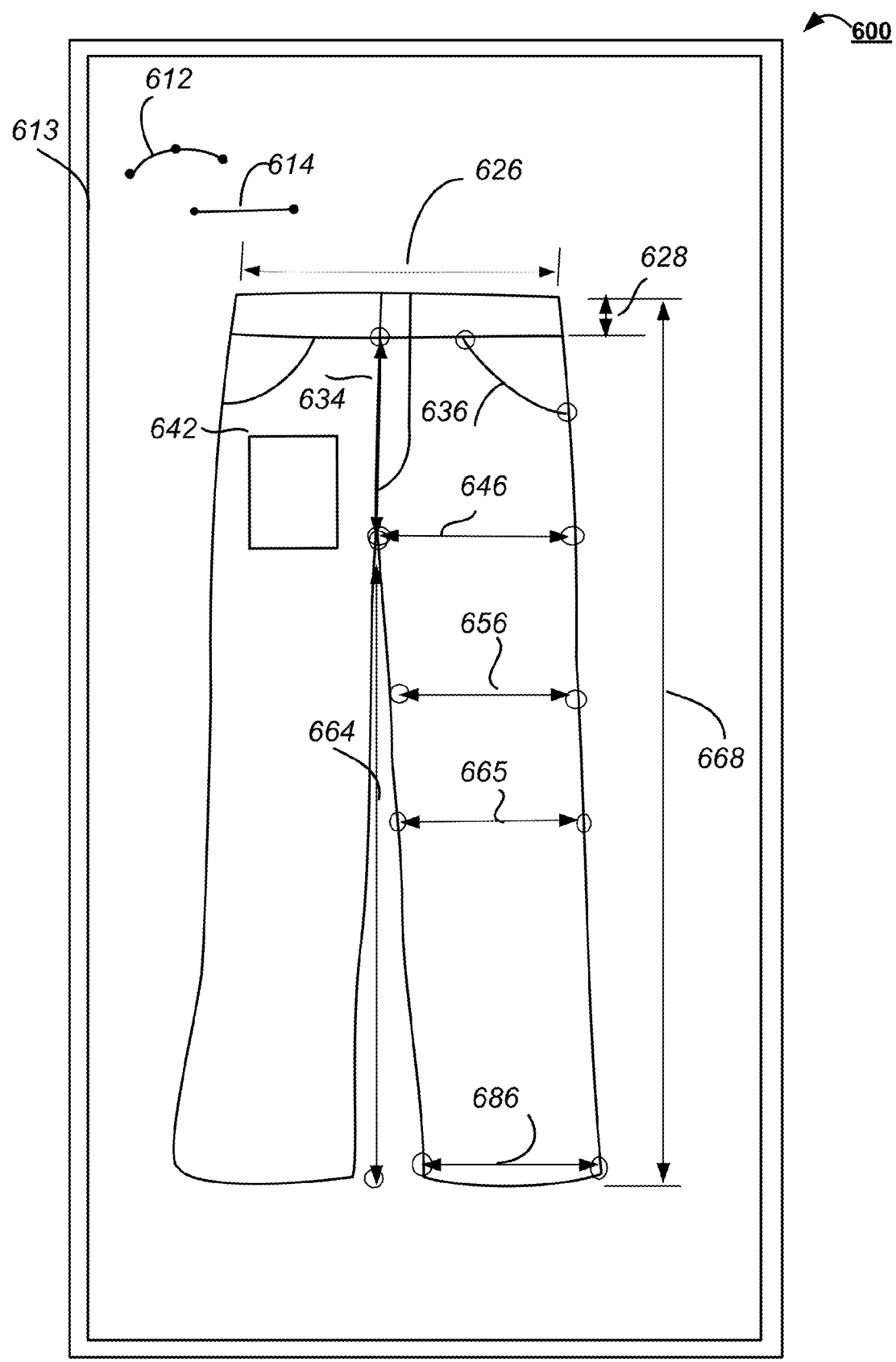
FIG. 6 is an adjusted image of a second pair of favorite pants, together with exemplary line measurement tools, with different styles.

FIG. 6 shows an adjusted image of a second style of favorite pair of pants with measurements 600 as it would be displayed on a screen 613 of a user display, with dimensions useful for requesting a favorite pair of pants very different from the pair of pants displayed in FIG. 5. Reference rectangle 642 in FIG. 6 is shown as a true rectangle with opposite sides being the same length and with 90° angles at its corners—the scale reference. Adjusted image FIG. 6 also includes two examples of line measurement tools: a straight-line measurement tool 614 and a curved-line measurement tool 612. As described for the earlier example clothing article images, line measurement tools 612, 614 are used to connect pairs of measurement reference positions. In this example, curved line measurement tool 612 is used to create the measurement for pocket stitching curvature 636. Straight line measurement tool 614 is used to create each of the following measurement lines: waist measurement line 626, waistband width 628, waist to crotch 634, width at hips 636, pant leg width at crotch 646, pant leg width at thigh 656, pant leg width at knee 665, pant leg width at bottom seam 686, pant total length 668, and inseam length 664. Note that a comparison of the relative relationships between the measurements in the two pants figures in FIG. 5 and FIG. 6 yield different design parameters.

In another implementation for determining measurements for custom clothing manufacture, the measurement-from-photo engine 112 can adjust the perspective using measurements from stereographic images of a clothing article and scale reference, as described next. In this scenario, the measurement-from-photo engine 112 receives first and second raw stereographic images of a clothing article, optionally including a scale reference, with an indication of lens system characteristics sufficient for scaling a field of view in the raw stereographic images. Using a hardware processor, the measurement-from-photo engine 112 determines distances from the lens system to at least three points in the raw stereographic image pair and applies a perspective correction based on the distances, to produce at least one adjusted image. A plane defined by the three points can be adjusted to be perpendicular to the view of the camera, between the camera and a reference point such as the center of the raw image. The properties of the lens system can be used to determine what a one percent, one pixel or one degree divergence from the center represents. The measurement-from-photo engine 112 determines a scale of the adjusted image from at least one of the distances combined with the lens system characteristics for use with the line measurement tool; and causes display of the adjusted image and the line measurement tool on a user display, such as a monitor or an optical head-mounted display—in one example a virtual reality headset: Oculus Rift. The stereo images can be used for perspective adjustment and a single, non-stereoscopic image used for measurement.

Distance to three points on a plane can be alternatively be determined using an image and accompanying depth map from a so-called time-of-flight camera. The depth map allows selection of three or more points in the image to define (or over-define) a plane. The perspective correction proceeds as described earlier, based on the three points. Information about the lens system is used by the time-of-flight camera when preparing the depth map. The scale of the image can be determined by combining the depth map with the reasonable assumption that the article of clothing has been positioned on a flat surface. For a discussion of alternative approaches to determining positions in 3D imaging, see, e.g., Larry Li, "Time-of-Flight Camera—An Introduction", Technical White Paper SLOA 190B (rev. May 2014) <accessed at http://www.ti.com/lit/wp/sloa190b/sloa190b.pdf on Apr. 25, 2016>, which is hereby incorporated by reference.

The stereographic image-based method includes measurement-from-photo engine 112 receiving user input that positions ends of the line measurement tool on measurement reference positions on the adjusted image of the clothing article; and generating a clothing article distance between the measurement reference positions on the adjusted image of the clothing article using the line measurement tool; and repeating the receiving user input and clothing article distance generating steps n times to generate n+1 clothing article distances, with n equal to at least three. The generated clothing article distances can be stored for use in producing a custom clothing article with a fit based on the clothing article in the raw image, similar to the methods described earlier.

In another use case, the generation of clothing distance parameters based on the measurement reference positions on the raw image displayed from the stereographic images can be completed, and then the perspective can be transformed—using a hardware processor, and determining distances from the lens system to at least three points in the raw stereographic images and applying a perspective correction based on the distances to produce at least one adjusted image. For the linear transformations—photo perspective and scale, the order and number of linear transformations applied is changeable without affecting the outcome. As described for the earlier use cases, the clothing article distances can be stored for use in producing a custom clothing article with a fit based on the clothing article in the raw image.

Some implementations can include a method of submitting a template for manufacture of a custom article of clothing comprising arranging a clothing article in a display orientation; placing a reference rectangle on or near the clothing article in the display orientation; capturing a raw image of the clothing article together with the reference rectangle, the raw image having a perspective; electronically submitting the raw image to a custom clothing manufacturing process with an identification of the reference rectangle sufficient for scaling of the reference rectangle in a perspective-adjusted version of the raw image.

For other implementations the method can include submitting a template for manufacture of a custom article of clothing including arranging a clothing article in a display orientation; capturing a pair of raw stereographic images of the clothing article through a lens system, the raw images having a perspective; electronically submitting the raw stereographic images to a custom clothing manufacturing process with an identification of optical characteristics of the lens system sufficient for scaling a field of view in the raw stereographic images to produce a perspective-adjusted and scaled version of the raw stereographic images.

In another implementation of the disclosed technology, the disclosed method for determining measurements for clothing can be utilized for quality control purposes. For example, a manufacturing company that employs quality control for ensuring standard dimensions and tolerances in their produced garments can use the measured clothing article distances to verify that batches of garments meet the required tolerances for standard, pre-defined size measurements. For some use cases, garment manufacturers can implement automated sizing on newly completed garments before they ship the garments to customers.

Another use case for the disclosed technology includes a commercial distributor of garments who determines the best standard sizing to distribute to the shopper, based on the measurements determined for the image of the garment provided to the distributor by the shopper. In one example, a distributor can confirm that the dimensions measured—of the article distances from the garment image submitted by the shopper—are sufficient for a slim fit, a regular fit, a plus size, a petite size or a tall fit.

System Flow

Figure 7:
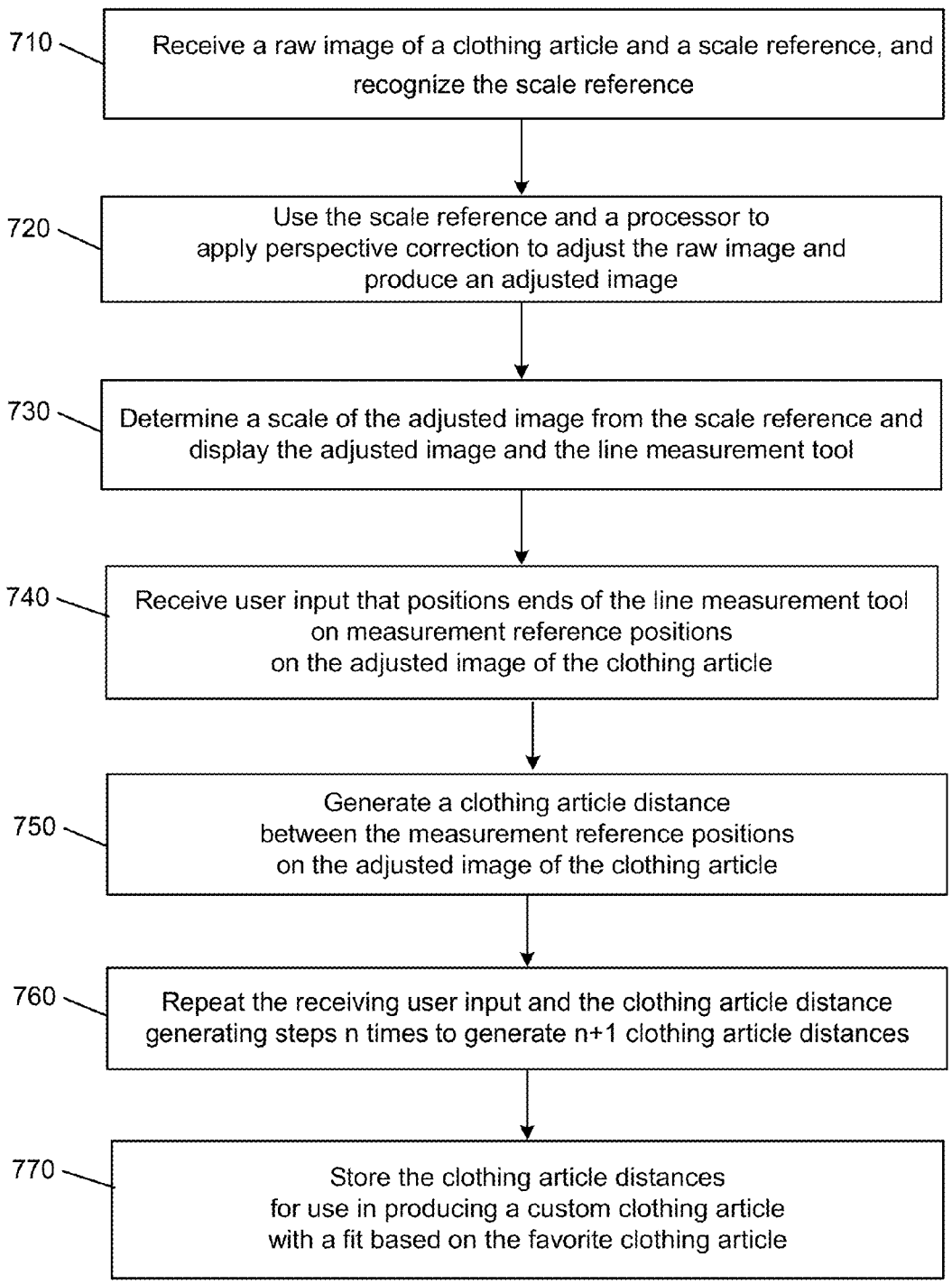
FIG. 7 shows an example workflow for determining measurements for custom clothing manufacture.

FIG. 7 illustrates a flowchart of one implementation 700 of implementing method for determining measurements for custom clothing manufacture. Flowchart 700 can be implemented at least partially with a database system, e.g., by one or more processors configured to receive or retrieve information, process the information, store results, and transmit the results. Other implementations may perform the steps in different orders and/or with different, fewer or additional steps than the ones illustrated in FIG. 7. The actions described later can be subdivided into more steps or combined into fewer steps to carry out the method described using a different number or arrangement of steps.

In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

At action 710, the measurement-from-photo engine 112 receives a raw image of a clothing article and a scale reference, and recognizes the scale reference.

At action 720, the measurement-from-photo engine 112 uses the scale reference and a hardware processor to apply perspective correction to adjust the raw image and produce an adjusted image.

At action 730, the measurement-from-photo engine 112 determines a scale of the adjusted image from the scale reference for use with a line measurement tool, and causes display of the adjusted image and the line measurement tool on a user display device.

At action 740, the measurement-from-photo engine 112 receives user input that positions ends of the line measurement tool on measurement reference positions on the adjusted image of the clothing article.

At action 750, the measurement-from-photo engine 112 generates a clothing article distance between the measurement reference positions on the adjusted image of the clothing article using the line measurement tool.

At action 760, the measurement-from-photo engine 112 repeats the receiving user input and the clothing article distance generating steps n times to generate at least n+1 clothing article distances, n being an integer equal to at least 3.

At action 770, the measurement-from-photo engine 112 stores the at least n+1 clothing article distances for use in producing a custom clothing article with a fit based on the clothing article in the raw image.

Computer System

Figure 8:
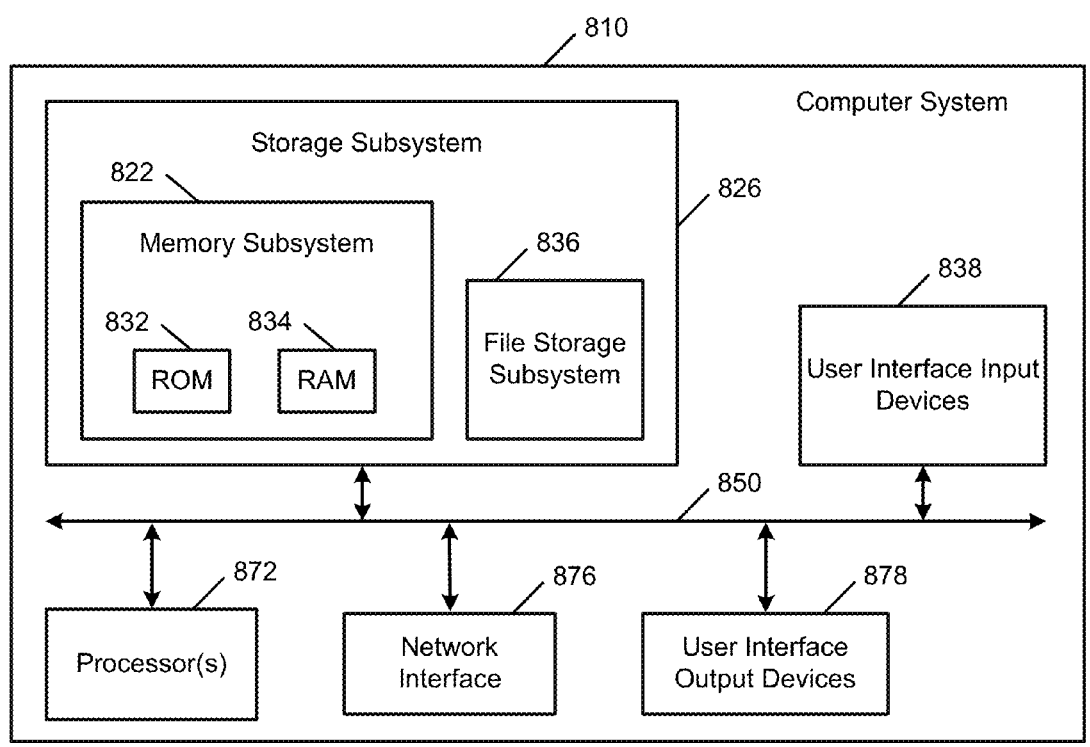
FIG. 8 shows an example computer system for determining measurements for custom clothing manufacture.

FIG. 8 is a block diagram of an example computer system 800 for implementing method of determining measurements for custom clothing manufacture. FIG. 8 is a block diagram of an example computer system, according to one implementation. The processor can be an ASIC or RISC processor. It can be an FPGA or other logic or gate array. It can include graphic processing unit (GPU) resources. Computer system 810 typically includes at least one processor 872 that communicates with a number of peripheral devices via bus subsystem 850. These peripheral devices may include a storage subsystem 826 including, for example, memory devices and a file storage subsystem, user interface input devices 838, user interface output devices 878, and a network interface subsystem 876. The input and output devices allow user interaction with computer system 810. Network interface subsystem 876 provides an interface to outside networks, including an interface to corresponding interface devices in other computer systems.

User interface input devices 838 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include the possible types of devices and ways to input information into computer system 810.

User interface output devices 878 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include the possible types of devices and ways to output information from computer system 810 to the user or to another machine or computer system.

Storage subsystem 824 stores programming and data constructs that provide the functionality of some or all of the modules and methods described herein. These software modules are generally executed by processor 872 alone or in combination with other processors.

Memory 822 used in the storage subsystem can include a number of memories including a main random access memory (RAM) 834 for storage of instructions and data during program execution and a read only memory (ROM) 832 in which fixed instructions are stored. A file storage subsystem 836 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 336 in the storage subsystem 826, or in other machines accessible by the processor.

Bus subsystem 850 provides a mechanism for letting the various components and subsystems of computer system 810 communicate with each other as intended. Although bus subsystem 850 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as one example. Many other configurations of computer system 810 are possible having more or fewer components than the computer system depicted in FIG. 8.

Clauses

The following clauses describe aspects of various examples of methods relating to custom clothing manufacture.

1. A method of determining measurements for custom clothing manufacture, including: receiving a raw image of a clothing article and a scale reference; recognizing the scale reference; using the scale reference and a hardware processor, applying perspective correction to adjust the raw image and produce an adjusted image; determining a scale of the adjusted image from the scale reference for use with a line measurement tool; causing display of the adjusted image and the line measurement tool on a user display; receiving user input that positions ends of the line measurement tool on measurement reference positions on the adjusted image of the clothing article; generating a clothing article distance between the measurement reference positions on the adjusted image of the clothing article using the line measurement tool; repeating the receiving user input and the clothing article distance generating steps n times to generate at least n+1 clothing article distances, n being an integer equal to at least 3; and storing the at least n+1 clothing article distances for use in producing a custom clothing article with a fit based on the clothing article in the raw image.

2. The clause according to claim 1, wherein: the scale reference comprises a reference rectangle in the raw image; the scale reference recognizing recognizes the reference rectangle in the raw image; and the scale determining uses a dimension of the reference rectangle in the adjusted image for use with the line measurement tool.

3. The clause according to claim 2, wherein the reference rectangle recognizing comprises receiving dimensions of the reference rectangle.

4. The clause according to claim 2, wherein the reference rectangle recognizing comprises obtaining dimensions for the reference rectangle from a database of reference rectangle dimensions.

5. The clause according to claim 2, wherein the reference rectangle in the raw image has an other than rectangular shape and the reference rectangle in the adjusted image has a rectangular shape.

6. The clause according to claim 1, wherein: the raw image receiving step is carried out with a shirt as the clothing article, the shirt comprising a body, the body having a front body part, a back body part, and upper and lower ends, the body further comprising a neck opening at the upper end of the body, a shoulder portion at the upper end of the body, a bottom portion at the lower end of the body, left and right armholes at the shoulder portion, and left and right sleeves, each of the left and right sleeves having a cuff at its outer end and an upper end joined to the body at the left and right armholes; and the repeating step is carried out to generate clothing article distances corresponding to at least the following: a shoulder measurement measured at the shoulder portion between left and right armholes, a chest measurement as measured at the front body part between lower ends of the left and right armholes, a hip measurement as measured at the bottom portion of the front body part, a sleeve length as measured along the sleeve from where the sleeve joins the shoulder portion at the arm hole to an inner end of the cuff, a height measurement between a central portion of the shoulder portion adjacent to the of the neck opening and lower end of the front body part, a bicep measurement of an arm at a bicep region, the bicep region spaced apart from the upper end of the sleeve about one quarter of the sleeve length, and a cuff measurement from the outer end of the sleeve to an outer end of the cuff.

7. The clause according to claim 6, wherein the shirt further comprises a collar joined to the body at the neck opening, and the repeating step is carried out to generate at least one collar measurement.

8. The clause according to claim 1, wherein n+1=12.

9. The clause according to claim 1, wherein the raw image receiving step is carried out receiving a raw image from a substantially two-dimensional object chosen from the following group: shorts, coats, jackets, sweaters, T-shirts, dresses and pants.

10. The clause according to claim 1, wherein the scale determining step is carried out for use with a straight line measurement tool.

11. The clause according to claim 1, wherein the scale determining step is carried out with a straight line measurement tool and a curved line measurement tool, both said tools displayed with the adjusted image on the user display.

12. A method of determining measurements for custom clothing manufacture, including: receiving a raw image of a clothing article and a scale reference; causing display of the raw image and a line measurement tool on a user display; receiving user input that positions ends of the line measurement tool on measurement reference positions on the raw image of the clothing article; generating at least a pair of clothing article distance parameters based on the measurement reference positions on the raw image of the clothing article using the line measurement tool; repeating the receiving user input and the generating clothing article distance parameters steps n times to generate at least n+1 clothing article distances, n being an integer equal to at least 3; recognizing the scale reference; using the scale reference and a hardware processor and applying perspective correction to adjust the raw image and produce an adjusted image; determining a perspective corrected scale of the adjusted image from the scale reference for use producing clothing article distances; transforming the clothing article distance parameters using the processor and the perspective corrected scale to produce clothing article distances; and storing the at least n+1 clothing article distances for use in producing a custom clothing article with a fit based on the clothing article in the raw image.

13. The clause according to claim 12, wherein generating at least a pair of clothing article distance parameters comprises generating first and second points.

14. The clause according to claim 12, wherein generating at least a pair of clothing article distance parameters comprises generating a distance and an angle orientation of a segment between the ends of the line measurement tool.

15. A method of determining measurements for custom clothing manufacture, including: receiving first and second raw stereographic images of a clothing article and a scale reference, with an indication of lens system characteristics sufficient for scaling a field of view in the raw stereographic images; using a hardware processor, determining distances from the lens system to at least three points in the raw stereographic images and applying a perspective correction based on the distances to produce at least one adjusted image; determining a scale of the adjusted image from at least one of the distances combined with the lens system characteristics for use with a line measurement tool; causing display of the adjusted image and the line measurement tool on a user display; receiving user input that positions ends of the line measurement tool on measurement reference positions on the adjusted image of the clothing article; generating a clothing article distance between the measurement reference positions on the adjusted image of the clothing article using the line measurement tool; repeating the receiving user input and clothing article distance generating steps n times to generate at least n+1 clothing article distances, n being an integer equal to at least 3; and storing the at least n+1 clothing article distances for use in producing a custom clothing article with a fit based on the clothing article in the raw image.

16. The clause according to claim 15, wherein the scale reference comprises a reference rectangle in the raw image; and the scale determining uses a dimension of the reference rectangle in the adjusted image for use with the line measurement tool.

17. The clause according to claim 15, wherein the reference rectangle in the raw image has an other than rectangular shape and the reference rectangle in the adjusted image has a rectangular shape.

18. A clause of determining measurements for custom clothing manufacture, including: receiving first and second raw stereographic images of a clothing article, with an indication of lens system characteristics sufficient for scaling a field of view in the raw stereographic images; causing display of at least one of the raw images and a line measurement tool on a user display; receiving user input that positions ends of the line measurement tool on measurement reference positions on the raw image of the clothing article; generating at least a pair of clothing article distance parameters based on the measurement reference positions on the raw image of the clothing article using the line measurement tool; repeating the receiving user input and generating clothing article distance parameters steps n times to generate at least n+1 clothing article distances, n being an integer equal to at least 3; using a hardware processor, determining distances from the lens system to at least three points in the raw stereographic images and applying a perspective correction based on the distances to produce at least one adjusted image; determining a perspective corrected scale of the adjusted image from at least one of the distances combined with the lens system characteristics for use with the clothing article distance parameters generated using the line measurement tool; transforming the clothing article distance parameters using the processor and the perspective corrected scale to produce clothing article distances; and storing the at least n+1 clothing article distances for use in producing a custom clothing article with a fit based on the clothing article in the raw image.

19. A method of submitting a template for manufacture of a custom article of clothing comprising: arranging a clothing article in a display orientation; placing an reference rectangle on or near the clothing article in the display orientation; capturing a raw image of the clothing article together with the reference rectangle, the raw image having a perspective; electronically submitting the raw image to a custom clothing manufacturing process with an identification of the reference rectangle sufficient for scaling of the reference rectangle in a perspective-adjusted version of the raw image.

20. A method of submitting a template for manufacture of a custom article of clothing comprising: arranging a clothing article in a display orientation; capturing a pair of raw stereographic images of the clothing article through a lens system, the raw images having a perspective; electronically submitting the raw stereographic images to a custom clothing manufacturing process with an identification of optical characteristics of the lens system sufficient for scaling a field of view in the raw stereographic images to produce a perspective-adjusted and scaled version of the raw stereographic images.

While implementations of the technology are disclosed by reference to the preferred embodiments and examples detailed earlier, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The earlier descriptions may have used terms such as above, below, top, bottom, over, under, et cetera. These terms may be used in the description and claims to aid understanding what is being disclosed and not used in a limiting sense.

One or more elements of one or more claims can be combined with elements of other claims.

What is claimed is:

1. A method of determining measurements for custom clothing manufacture, comprising:
    receiving a raw image of a clothing article and a scale reference;
    recognizing the scale reference;
    using the scale reference and a hardware processor, applying perspective correction to adjust the raw image and produce an adjusted image;
    determining a scale of the adjusted image from the scale reference for use with a line measurement tool;
    causing display of the adjusted image and the line measurement tool on a user display;
    receiving a user input that positions ends of the line measurement tool on measurement reference positions on the adjusted image of the clothing article;
    generating a clothing article distance between the measurement reference positions on the adjusted image of the clothing article using the line measurement tool;
    repeating the receiving user input and the clothing article distance generating steps n times to generate at least n+1 clothing article distances, n being an integer equal to at least 3; and
    storing the at least n+1 clothing article distances for use in producing a custom clothing article with a fit based on the clothing article in the raw image.

2. The method according to claim 1, wherein:
    the scale reference comprises a reference rectangle in the raw image;
    the scale reference recognizing recognizes the reference rectangle in the raw image; and
    the scale determining uses a dimension of the reference rectangle in the adjusted image for use with the line measurement tool.

3. The method according to claim 2, wherein the reference rectangle recognizing comprises receiving dimensions of the reference rectangle.

4. The method according to claim 2, wherein the reference rectangle recognizing comprises obtaining dimensions for the reference rectangle from a database of reference rectangle dimensions.

5. The method according to claim 2, wherein the reference rectangle in the raw image has an other than rectangular shape and the reference rectangle in the adjusted image has a rectangular shape.

6. The method according to claim 1, wherein:
    the raw image receiving step is carried out with a shirt as the clothing article, the shirt comprising a body, the body having a front body part, a back body part, and upper and lower ends, the body further comprising a neck opening at the upper end of the body, a shoulder portion at the upper end of the body, a bottom portion at the lower end of the body, left and right armholes at the shoulder portion, and left and right sleeves, each of the left sleeve and the right sleeve having a cuff at its outer end and an upper end joined to the body at the left and right armholes; and
    the repeating step is carried out to generate clothing article distances corresponding to at least the following: a shoulder measurement measured at the shoulder portion between the left and right armholes, a chest measurement as measured at the front body part between lower ends of the left and right armholes, a hip measurement as measured at the bottom portion of the front body part, a sleeve length as measured along one of the sleeves from where the sleeve joins the shoulder portion at the arm hole to an inner end of the cuff, a height measurement between a central portion of the shoulder portion adjacent to the of the neck opening and a lower end of the front body part, a bicep measurement of an arm at a bicep region, the bicep region spaced apart from the upper end of the sleeve about one quarter of the sleeve length, and a cuff measurement from the outer end of the sleeve to an outer end of the cuff.

7. The method according to claim 6, wherein the shirt further comprises a collar joined to the body at the neck opening, and the repeating step is carried out to generate at least one collar measurement.

8. The method according to claim 1, wherein n+1=12.

9. The method according to claim 1, wherein the raw image receiving step is carried out receiving a raw image from a substantially two-dimensional object selected from the group comprising shorts, coats, jackets, sweaters, T-shirts, dresses, and pants.

10. The method according to claim 1, wherein the scale determining step is carried out for use with a straight line measurement tool.

11. The method according to claim 1, wherein the scale determining step is carried out with a straight line measurement tool and a curved line measurement tool, both said tools displayed with the adjusted image on the user display.

12. A method of determining measurements for custom clothing manufacture, comprising:
receiving a raw image of a clothing article and a scale reference;
causing display of the raw image and a line measurement tool on a user display;
receiving a user input that positions ends of the line measurement tool on measurement reference positions on the raw image of the clothing article;
generating at least a pair of clothing article distance parameters based on the measurement reference positions on the raw image of the clothing article using the line measurement tool;
repeating the receiving user input and the generating clothing article distance parameters steps n times to generate at least n+1 clothing article distances, n being an integer equal to at least 3;
recognizing the scale reference;
using the scale reference and a hardware processor and applying perspective correction to adjust the raw image and produce an adjusted image;
determining a perspective corrected scale of the adjusted image from the scale reference for use in producing clothing article distances;
transforming the clothing article distance parameters using the processor and the perspective corrected scale to produce clothing article distances; and
storing the at least n+1 clothing article distances for use in producing a custom clothing article with a fit based on the clothing article in the raw image.

13. The method according to claim 12, wherein generating at least a pair of clothing article distance parameters comprises generating first and second points.

14. The method according to claim 12, wherein generating at least a pair of clothing article distance parameters comprises generating a distance and an angle orientation of a segment between the ends of the line measurement tool.

15. A method of determining measurements for custom clothing manufacture, comprising:
receiving first and second raw stereographic images of a clothing article and a scale reference, with an indication of lens system characteristics sufficient for scaling a field of view in the raw stereographic images;
using a hardware processor, determining distances from the lens system to at least three points in the raw stereographic images and applying a perspective correction based on the distances to produce at least one adjusted image;
determining a scale of the adjusted image from at least one of the distances combined with the lens system characteristics for use with a line measurement tool;
causing display of the adjusted image and the line measurement tool on a user display;
receiving a user input that positions ends of the line measurement tool on measurement reference positions on the adjusted image of the clothing article;
generating a clothing article distance between the measurement reference positions on the adjusted image of the clothing article using the line measurement tool;
repeating the receiving user input and clothing article distance generating steps n times to generate at least n+1 clothing article distances, n being an integer equal to at least 3; and
storing the at least n+1 clothing article distances for use in producing a custom clothing article with a fit based on the clothing article in the raw image.

16. The method according to claim 15, wherein:
the scale reference comprises a reference rectangle in the raw image; and
the scale determining uses a dimension of the reference rectangle in the adjusted image for use with the line measurement tool.

17. The method according to claim 15, wherein the reference rectangle in the raw image has an other than rectangular shape and the reference rectangle in the adjusted image has a rectangular shape.

18. The method according to claim 1, further comprising:
utilizing a controller to control a cloth cutting machine to cut cloth to from patterns according to the fit based on the clothing article in the raw image utilizing the n+1 clothing article distances.

19. The method according to claim 2, wherein the recognizing the reference rectangle is based on a rectangle scoring algorithm to find automatically the reference rectangle utilizing steps comprising:
locating perspectives of candidate rectangles in the raw image;
scoring the candidate rectangles to identify a quadrilateral that corresponds to the reference rectangle; and
computing a four-point transform of points in the identified quadrilateral to form a rectangle with right angles at its corners,
wherein the four-point transform is applied to the raw image to achieve the perspective correction.

20. The method according to claim 2, wherein the reference rectangle is selected from the group consisting of an 8.5×11 sheet of paper and a credit card.

* * * * *